(12) United States Patent
Venkatakrishnan et al.

(10) Patent No.: US 10,983,974 B2
(45) Date of Patent: Apr. 20, 2021

(54) METHOD OF GENERATING A KNOWLEDGE-TREE FOR INTUITIVE CONTINUAL LEARNING

(71) Applicants: Baranitharan Venkatakrishnan, Dublin, OH (US); Bhaskar Babu Narasimhaiah, Columbus, OH (US)

(72) Inventors: Baranitharan Venkatakrishnan, Dublin, OH (US); Bhaskar Babu Narasimhaiah, Columbus, OH (US)

( * ) Notice: Subject to any disclaimer, the term of this patent is extended or adjusted under 35 U.S.C. 154(b) by 362 days.

(21) Appl. No.: 16/133,646

(22) Filed: Sep. 17, 2018

(65) Prior Publication Data
US 2019/0087448 A1    Mar. 21, 2019

Related U.S. Application Data

(60) Provisional application No. 62/559,175, filed on Sep. 15, 2017.

(51) Int. Cl.
| | |
|---|---|
| *G06F 16/22* | (2019.01) |
| *G06F 21/31* | (2013.01) |
| *G06F 16/23* | (2019.01) |
| *G06F 16/248* | (2019.01) |
| *G09B 5/00* | (2006.01) |

(52) U.S. Cl.
CPC .......... *G06F 16/2246* (2019.01); *G06F 16/23* (2019.01); *G06F 16/248* (2019.01); *G06F 21/31* (2013.01); *G09B 5/00* (2013.01)

(58) Field of Classification Search
CPC .. G06F 16/248; G06F 16/9535; G06F 16/951; G06F 3/0482; G06F 16/29; G06F 16/26; G06F 16/90335; G06F 8/34; G06F 9/30058
See application file for complete search history.

(56) References Cited

U.S. PATENT DOCUMENTS

| | | | |
|---|---|---|---|
| 2011/0208822 A1* | 8/2011 | Rathod ............... | G06F 16/9535 709/206 |
| 2015/0140526 A1* | 5/2015 | Marino .............. | G06Q 10/1053 434/219 |
| 2015/0269244 A1* | 9/2015 | Qamar ............. | G06Q 10/06398 705/7.42 |

* cited by examiner

*Primary Examiner* — Angelica Ruiz

(57) ABSTRACT

A method of generating a knowledge-tree to manage education-related information and experience-related information is provided with a plurality of learner accounts, at least one verification account, and at least one external viewing account. A specific learner account from the plurality of learner accounts uploads personal educational information and a personal experiential information to a remote server. Based upon the uploaded information, the verification account executes a verification process and a career planning process. The verified information and a career roadmap created for the specific learner account will be presented to the external-viewing account. The specific learner account can be a job seeker and the external viewing account can be a potential employer.

12 Claims, 13 Drawing Sheets

Providing at least one remote server, wherein the at least one remote server comprises a knowledge-tree generating algorithm

↓

Providing a plurality of learner accounts managed by the at least one remote server, wherein each of the plurality of learner accounts is associated with a corresponding personal computing (PC) device

↓

Providing at least one verification account managed by the at least one remote server, wherein the at least one verification account is associated with a corresponding PC device

↓

Providing at least one external-viewing account managed by the at least one remote server, wherein the at least one external-viewing account is associated with a corresponding PC device

↓

(A) Prompting a specific learner account from the plurality of learner accounts to upload a plurality of education-related information and a plurality of experience-related information through the corresponding PC device

↓

(B) Receiving and categorizing the plurality of education-related information and the plurality of experience-related information through the corresponding PC device of the specific learner account

METHOD OF GENERATING A KNOWLEDGE-TREE FOR INTUITIVE CONTINUAL LEARNING

The current application claims a priority to the U.S. Provisional Patent application Ser. No. 62/559,175 filed on Sep. 15, 2017. The current application is filed on Sep. 17, 2018 while Sep. 15, 2018 was on a weekend.

FIELD OF THE INVENTION

The present invention relates generally to a method of knowledge representation for continual learning. More specifically, the present invention is a method to represent all available knowledge onto a knowledge-tree that can be used for presentation purposes and interaction purposes.

BACKGROUND OF THE INVENTION

Resumes and other professional profiles are currently used to represent the educational qualifications and the experience of an individual. Even though these methods have certain benefits, there are certain drawbacks too. As an example, the fixed structure of professional profiles limits an individual from showcasing all personal qualifications. In another instance, a resume might not showcase ongoing certifications and other relatable processes. Thus, the need for a method that does not limit an individual to a fixed structure is essential.

The objective of the present invention is to effectively showcase all educational qualifications and experience of an individual. To do so, the present invention introduces a method that can visually represent the educational qualifications and the experience-related qualifications of an individual. More specifically, the present invention introduces a knowledge-tree that can be used to organize and represent all education related information and experience related information. In addition to representing the individual qualifications, the present invention enables effective interaction so that potential employers or recruiters can view the qualifications of the individual. Furthermore, the present invention persuades the user to obtain additional qualifications that can relate to existing qualifications.

Each entry of the knowledge-tree will be categorized for convenience in understanding, and representational clarity. The educational qualifications will be categorized according to the educational standard. As an example, elementary school education, middle-school education, high-school education, and college education of a user will be represented separately along a root portion of the knowledge-tree. Courses, certifications, and subjects related to the user can also be represented along the root portion after proper categorization. On the other hand, skills, work experience, and other comparable information will be represented on branches of the knowledge-tree that are separate from the educational qualifications. The overall layout generated through the present invention allows an authorized viewer to fully understand the strengths and weaknesses of an individual and interact with an individual.

The present invention intends to make the life-long learning process convenient in the current rapidly changing market. Moreover, the present invention intends to help the users understand and utilize the current market trends and market designs to personalize career paths. By executing continuous analysis on the individual career paths, the present invention ensures the user is held accountable for career growth-related activities and education enhancement-related activities.

BRIEF DESCRIPTION OF THE DRAWINGS

FIG. 2A is a flowchart illustrating the basic overall process of the present invention.

DETAIL DESCRIPTIONS OF THE INVENTION

Figure 1A:
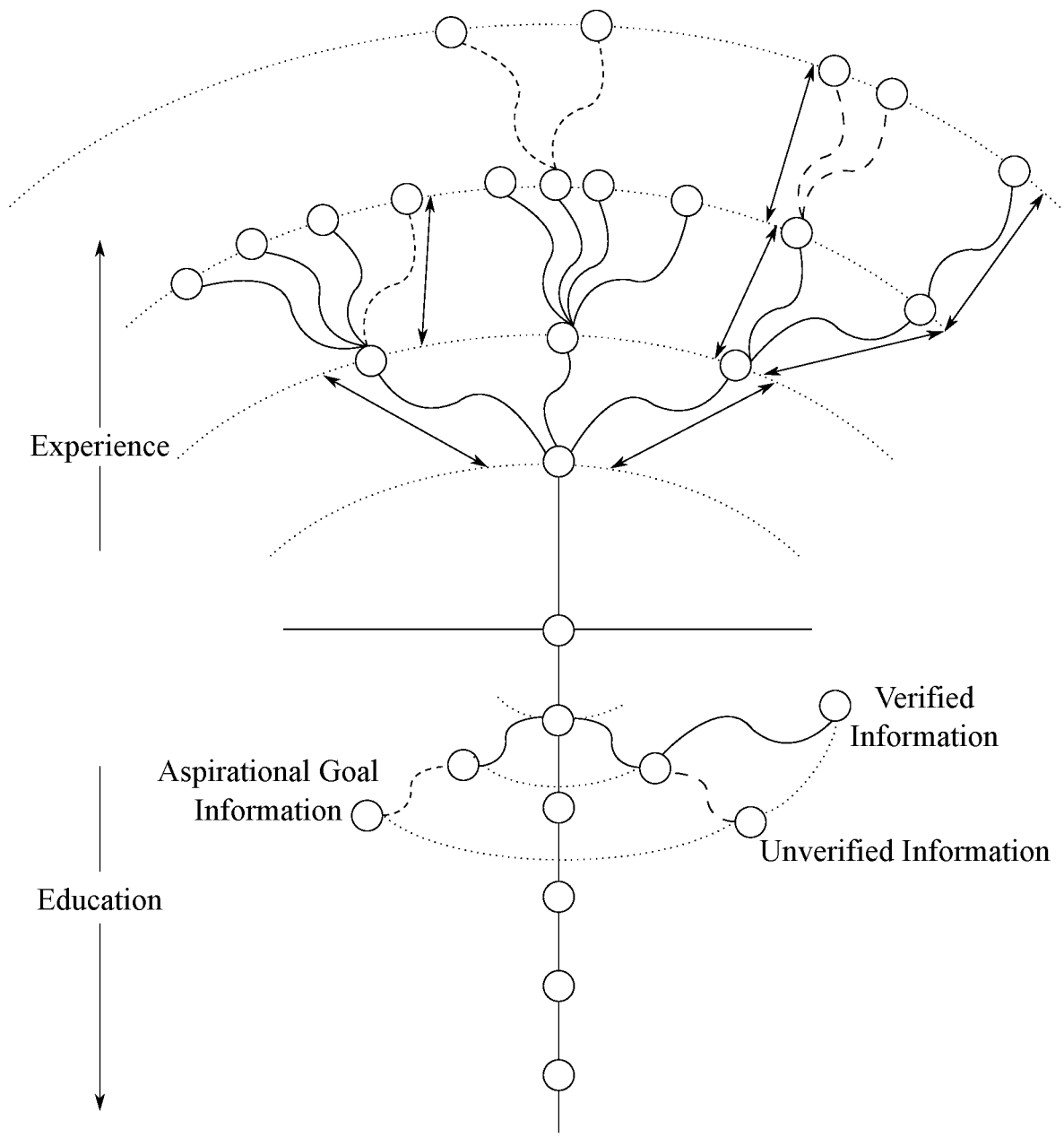
FIG. 1A is an illustration of a generic knowledge-tree generated by the present invention, wherein node traversal is also represented.

All illustrations of the drawings are for the purpose of describing selected versions of the present invention and are not intended to limit the scope of the present invention.

The present invention introduces a method for generating a knowledge-tree for intuitive continual learning. More specifically, the present invention represents all available educational information and experiential information of an individual through a visual representation named the knowledge-tree. By doing so, the present invention promotes interaction with an external source that can be, but is not limited to, a potential employer. The overall layout of the knowledge-tree allows the potential employer or other external viewer to conveniently grasp the information presented through the knowledge-tree. Additionally, the knowledge-tree allows the user to present a vast amount of information in an organized manner.

To fulfill the intended functionalities, the present invention is provided with at least one remote server that comprises a knowledge-tree generating algorithm. To receive data for generating the knowledge-tree, the present invention is further provided with a plurality of learner accounts which is managed by the at least one remote server. To upload, view, and display the knowledge-tree and other related information, each of the plurality of learner accounts is associated with a corresponding personal computing (PC) device. The corresponding PC device can be, but is not limited to, a mobile phone, a tablet, a wearable device, or a computer. For the educational qualifications and the experience of the individual to be verified prior to being viewed by a potential employer or comparable viewer, the present invention is provided with at least one verification account that is also managed by the at least one remote server. To execute the verification process, the at least one verification account is associated with a corresponding PC device. As discussed before, the present invention can be used by a job-seeking individual to provide information to a potential employer. In such instances, the job-seeking individual will utilize a selected account from the plurality of learner accounts. For the potential employer to view the information related to the job-seeking individual and interact with the information related to the job-seeking individual, the present invention is provided with at least one external-viewing account that is also managed by the at least one remote server. The at least one external-viewing account will also have a corresponding PC device that is used to view and interact with the information related to the job-seeking individual.

When in use, the present invention initially prompts a specific learner account from the plurality of learner accounts to upload a plurality of education-related information and a plurality of experience-related information through the corresponding PC device. The plurality of education-related information can be, but is not limited to, the educational institutes the specific learner account attended and the levels of education the specific learner account obtained. On the other hand, the plurality of experience-related information can include, but is not limited to, knowledge obtained from coursework, work experience, personal skills, and specializations in a field.

Figure 1B:
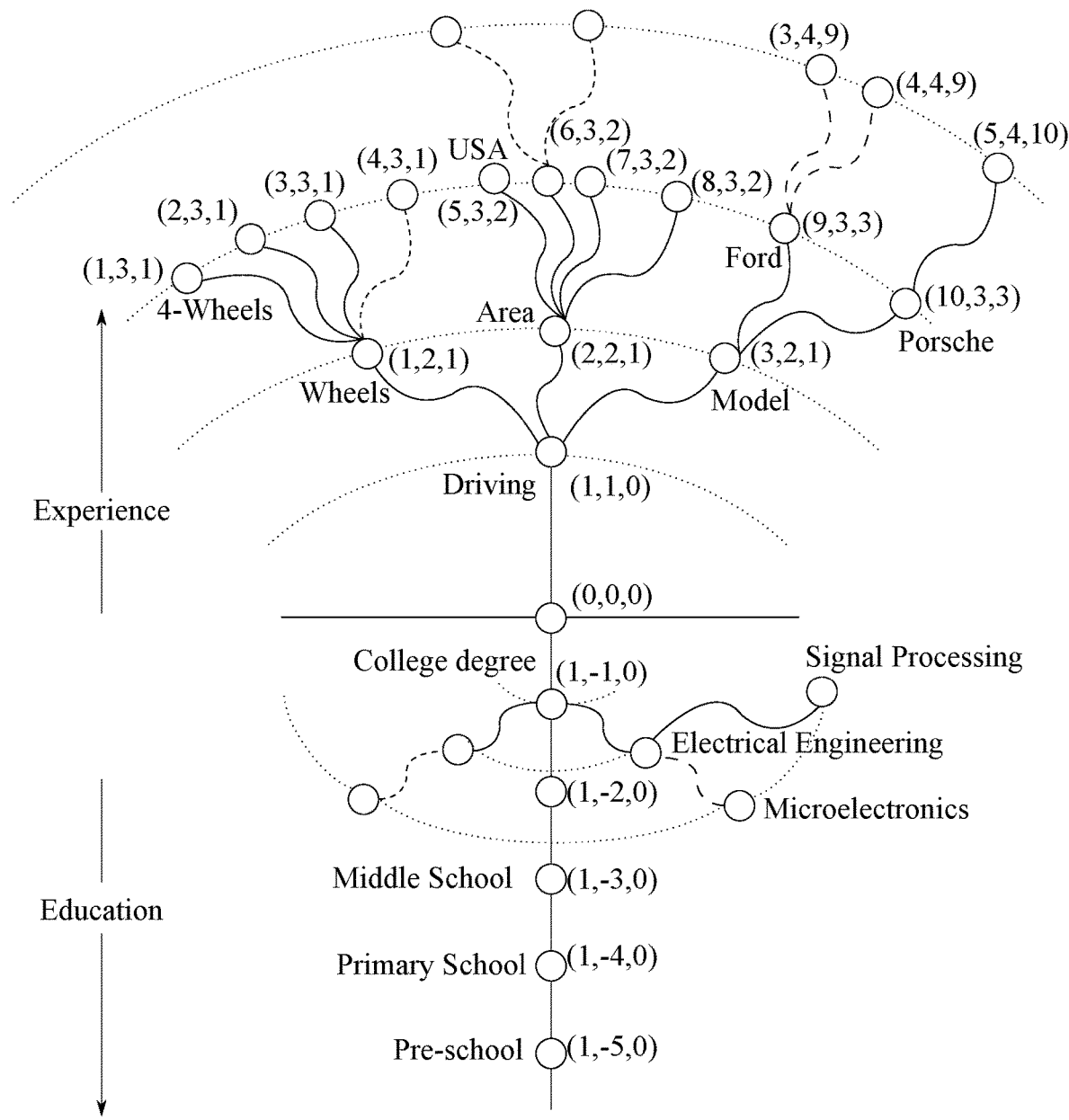
FIG. 1B is an illustration of a knowledge-tree generated by the present invention, wherein the specific knowledge-tree is generated for driving.

When the plurality of education-related information and the plurality of experience-related information is received, the present invention categorizes the plurality of education-related information and the plurality of experience-related information through the corresponding PC device of the specific learner account. As an example, a first level of the plurality of education-related information will consist of the education level of the specific learner account. A second level of the plurality of education-related information will consist of the degree of the specific learner account such that the second level is represented to be dependent on the first level. As shown in FIG. 1B, if the specific learner account has an undergraduate degree in electrical engineering, the present invention will categorize the data entry such that the first level indicates that the specific learner account has an undergraduate degree. The present invention will further categorize the data entry such that the degree in electrical engineering is shown in a second level, wherein the second level is an extension of the first level. If the specific learner account has specialized in microelectronics, the present invention will categorize microelectronics as a third level that is a sub section of the second level that represents electrical engineering. If the specific learner account has another specialization in signal processing, the present invention will categorize signal processing in the third level under the second level that represents electrical engineering. Thus, the specialization in microelectronics and signal processing will be categorized as sub sections that are dependent of the second level that represents electrical engineering. If required, other specific information such as relevant coursework will be represented in a subsection that extends from microelectronics and/or signal processing.

Similar to the plurality of education-related information, each data entry of the plurality of experience-related information will also be categorized by the present invention. The plurality of experience-related information can be, but is not limited to being categorized as, core technology fields, tools and products, domains, management, operations, and infrastructure. As an example, we will consider that the specific learner account has computer programming experience in Canada and Mexico. Upon receiving the data entry, the present invention categorizes the data entry to show the programming experience in a primary level. Since the specific learner has experience in two distinct geographical areas, the coding experience will further be categorized by area that will be displayed in a secondary level. Canada and Mexico will then appear as a subsection extending from the secondary level. If the specific learner account has experience in multiple programming languages, the type of programming language will be categorized in a secondary level that extends from the coding experience. If Java and Python were used by the specific learner account, Java and Python will be categorized under a sub section that extends from the secondary level showing the type of programming language.

As further illustrated in FIG. 1B, we will consider the specific learner account having experience driving a manual transmission vehicle. In this instance, driving will be categorized in the primary level in a knowledge-tree specifically dedicated to display the experience of the specific learner account in the field of driving. The number of wheels on the vehicle will be a first category of the secondary level that extends from the primary level. The area in which the vehicle was driven in will be a second category of the secondary level. The model of the vehicle will be a third category of the secondary level. Since each aspect of the experience is categorized, a viewer can fully understand all information related to the experience of the specific learner account.

Figure 2B:
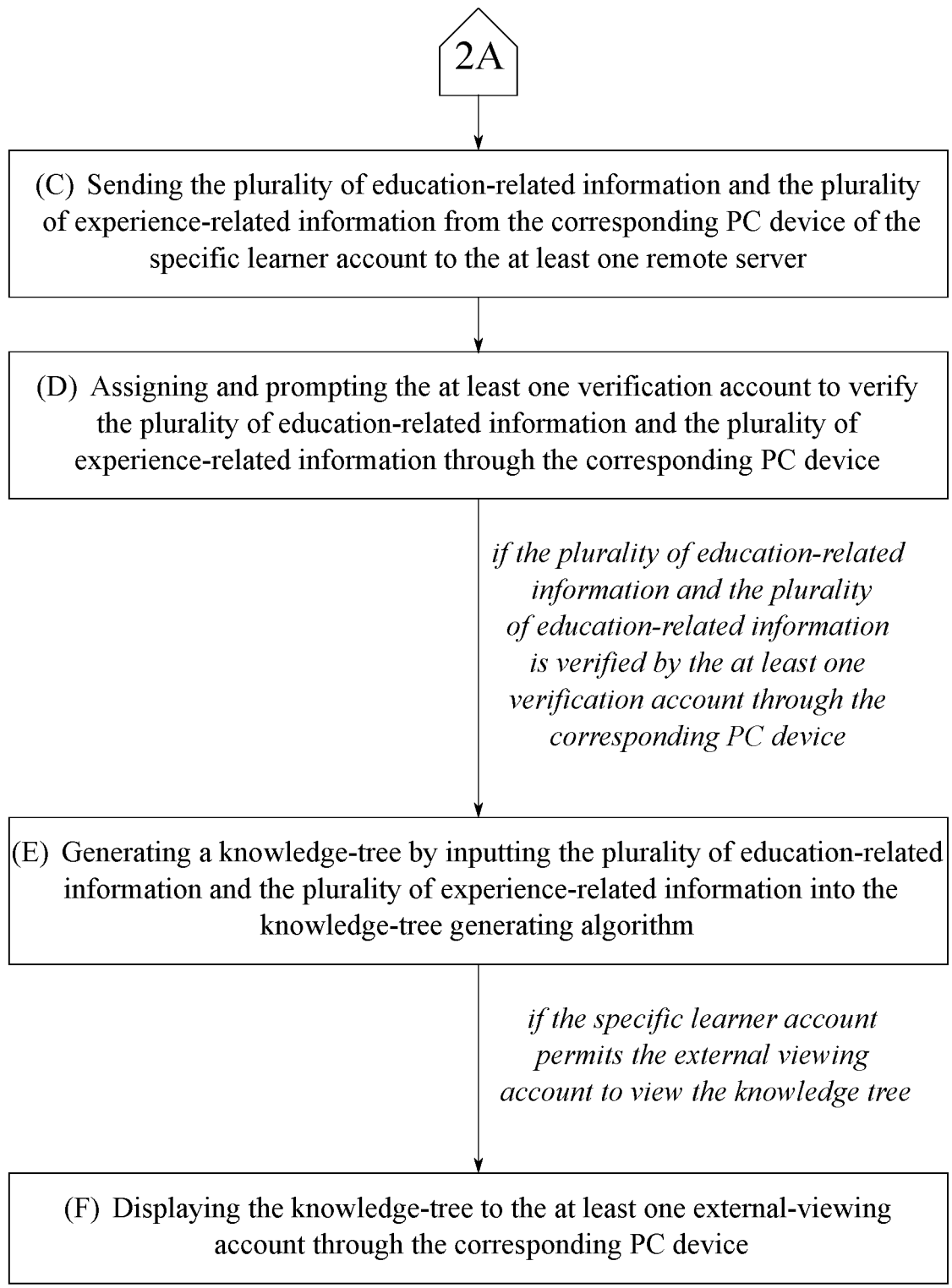
FIG. 2B is a continuation thereof, further illustrating the basic overall process of the present invention.

As shown in FIG. 2A and FIG. 2B, when the plurality of education-related information and the plurality of experience-related information is received and categorized, the present invention sends the plurality of education-related information and the plurality of experience-related information to the at least one remote server through the corresponding PC device of the specific learner account. When the plurality of education-related information and the plurality of experience-related information is stored on the at least one remote server, the present invention then proceeds to assign and prompt the at least one verification account to verify the plurality of education-related information and the plurality of experience-related information. The at least one verification account is assigned based upon the education-related information and the experience-related information such that the verification process executed through the at least one verification account guarantees the authenticity of the plurality of education-related information and the plurality of experience-related information.

If the at least one verification account verifies the plurality of education-related information and the plurality of experience-related information through the corresponding PC device, the present invention generates the knowledge-tree. To do so, the present invention inputs the plurality of education-related information and the plurality of experience-related information into the knowledge-tree generating algorithm of the at least one remote server. When the knowledge-tree is generated, the present invention displays the knowledge-tree to the at least one external-viewing account through the corresponding PC device, if the specific learner account has permitted the at least one external-viewing account to view the knowledge-tree. By viewing the knowledge-tree, a viewer can have a thorough understanding of the plurality of education-related information and the plurality of experience-related information of the specific learner account.

Figure 3:
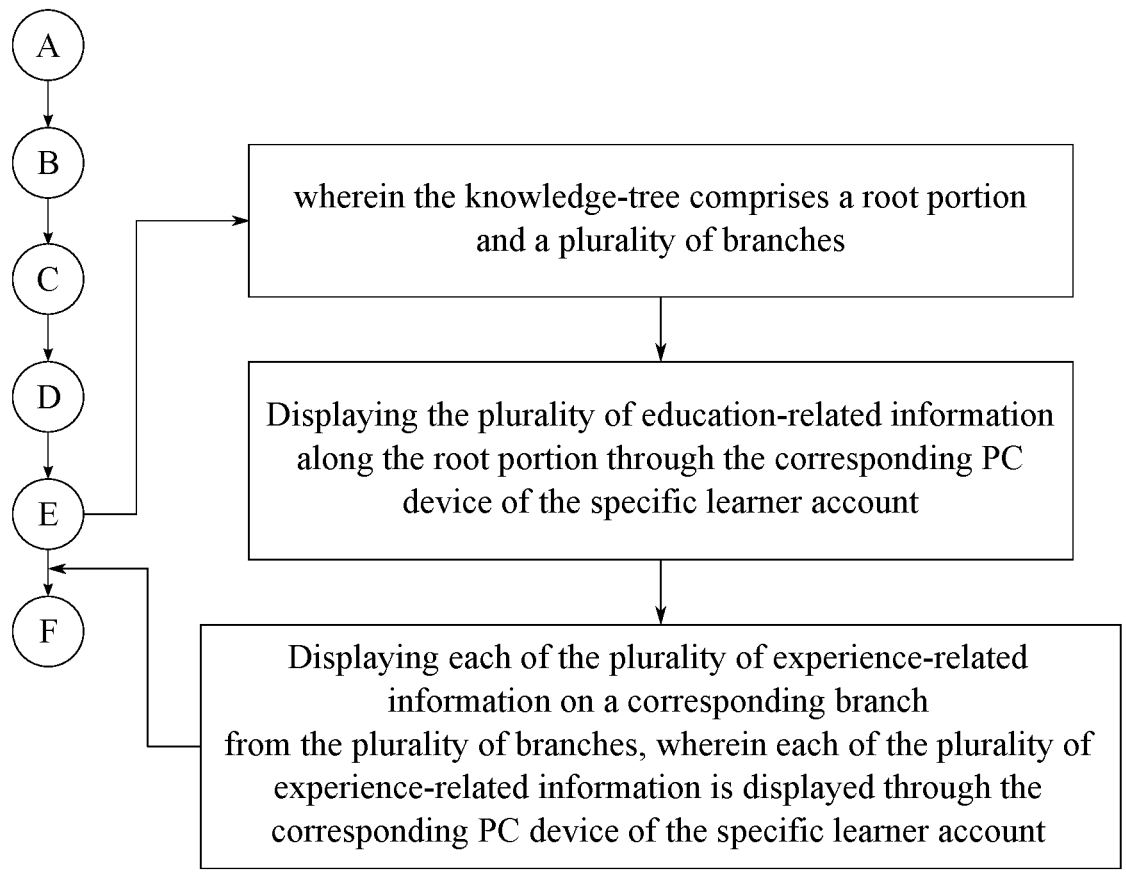
FIG. 3 is a flowchart illustrating the basic overall process of representing the education-related information and the experience-related information on the knowledge-tree.

As discussed earlier, the present invention categorizes the plurality of education-related information and the plurality of experience-related information. As illustrated in FIG. 3, to do so, the knowledge-tree comprises a root portion and a plurality of branches. As seen in FIG. 1A and FIG. 1B, the root portion is specifically used to represent the plurality of education-related information of the specific learner account. To do so, the present invention displays the education-related information along the root portion through the corresponding PC device of the specific learner account. The plurality of branches is specifically used to represent the plurality of experience-related information for the specific field represented by the knowledge-tree. To do so, the present invention displays each of the plurality of experience-related information on a corresponding branch from the plurality of branches. More specifically, each of the plurality of experience-related information is displayed through the corresponding PC device of the specific learner account. As discussed before, each aspect of both the plurality of education-related information and the experience-related information will be represented separately on the knowledge-tree. By following the same process flow used to generate a single knowledge-tree, a plurality of individual knowledge-trees can be generated to create a knowledge-forest for the specific learner account. The knowledge-forest will have the capability to showcase all relevant experiences of the specific learner account.

Figure 4:
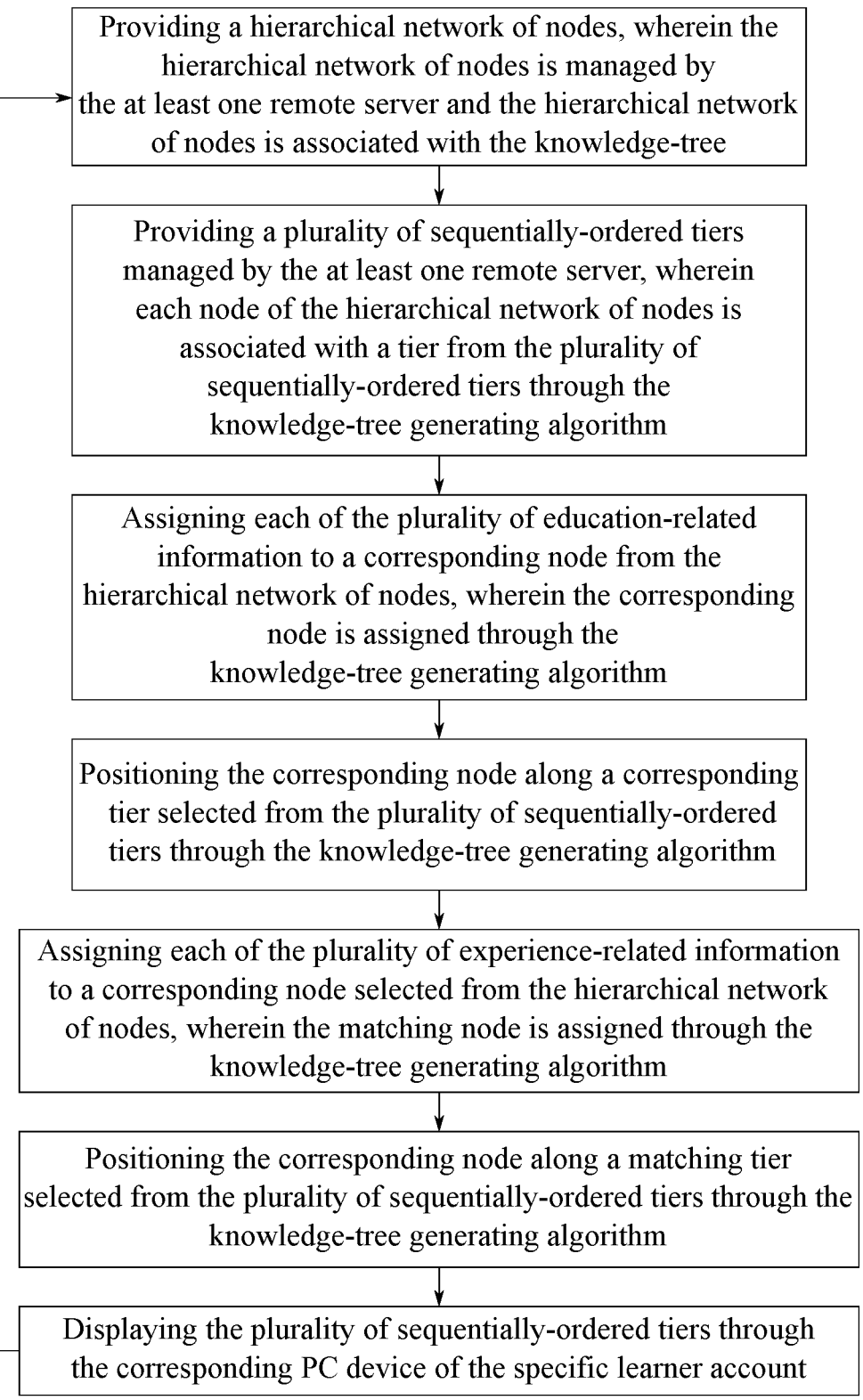
FIG. 4 is a flowchart illustrating the basic overall process of utilizing a hierarchical network of nodes and a plurality of sequentially-ordered tiers to represent the education-related information and the experience-related information.
Figure 5:
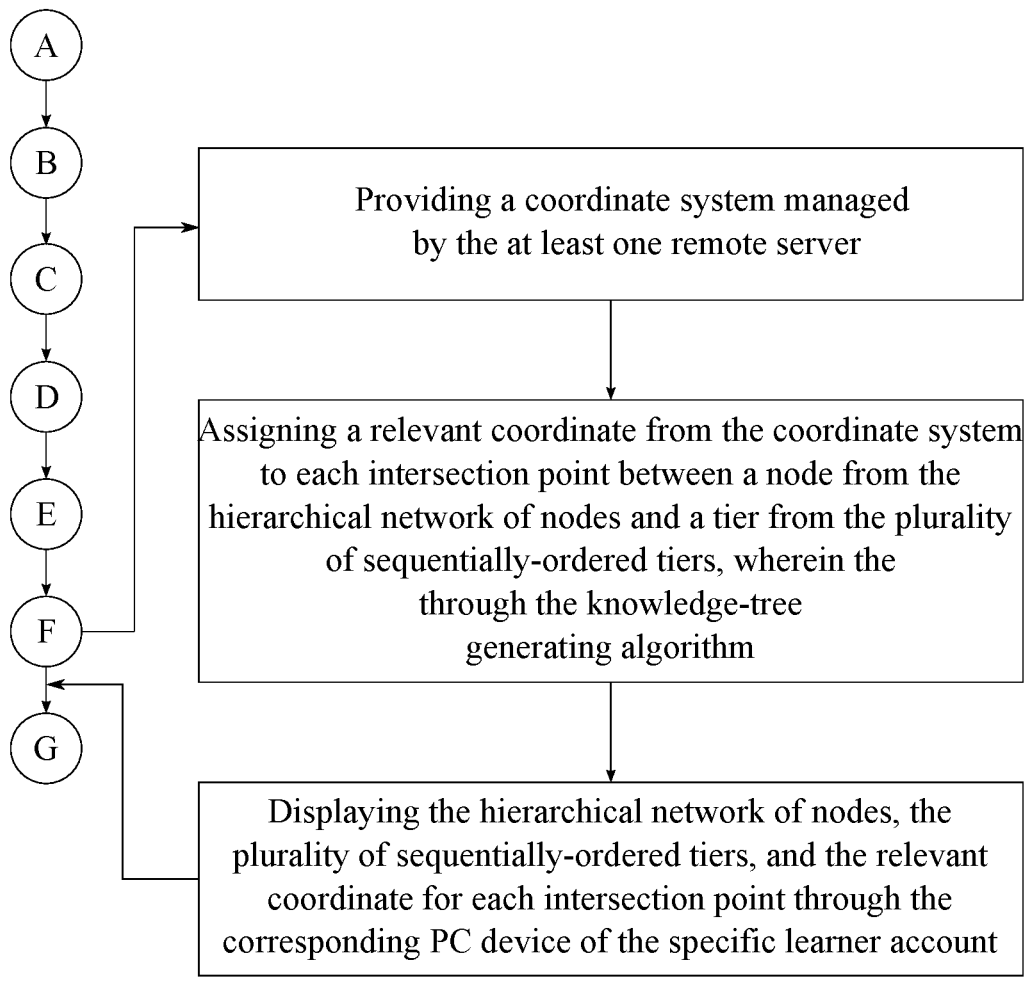
FIG. 5 is a flowchart illustrating the basic overall process of utilizing a coordinate system to represent each of the plurality of hierarchical nodes.

As shown in FIG. 4, to represent each of the plurality of education-related information along the root portion, and to represent each of the plurality of experience-related information along the plurality of branches, the present invention is provided with a hierarchical network of nodes and a plurality of sequentially-ordered tiers. Both the hierarchical network of nodes and the plurality of sequentially-ordered tiers are managed by the at least one remote server. The hierarchical network of nodes is associated with the knowledge-tree and each node of the hierarchical network of nodes is associated with a tier from the plurality of sequentially-ordered tiers through the knowledge-tree algorithm.

When the plurality of education-related information is received from the specific learner account, each of the plurality of education-related information is assigned to a corresponding node from the hierarchical network of nodes. The corresponding node is assigned through the knowledge-tree generating algorithm. Next, the present invention positions the corresponding node along a corresponding tier selected from the plurality of sequentially-ordered tiers through the knowledge-tree generating algorithm.

We will consider the previous example wherein the specific learner account has an undergraduate degree in electrical engineering with a specialization in microelectronics and signal processing. Since the data entry is education-related, the data entry will be represented along the root portion of the knowledge-tree. In this instance, the undergraduate degree will be represented by a first node selected from the hierarchical network of nodes. The first node will be positioned along a first tier from the plurality of sequentially-ordered tiers. A second node from the hierarchical network of nodes will represent the field of electrical engineering, and the second node will be positioned along a second tier from the plurality of sequentially-ordered tiers. To represent the specializations in microelectronics and signal processing, a third node and a fourth node from the hierarchical network of nodes are used. Since the specializations are dependent on the degree in electrical engineering, both the third node and the fourth node will be positioned along a third tier selected from the plurality of sequentially-ordered tiers. The positioning of the first tier, the second tier, and the third tier is such that, the first tier is positioned closest to the origin. The third tier is positioned farthest away from the origin while the second tier is positioned in between the first tier and the third tier.

When the plurality of experience-related information is received from the specific learner account, each of the plurality of experience-related information is assigned to a corresponding node selected from the hierarchical network of nodes. The corresponding node is assigned through the knowledge-tree generating algorithm. Next, the present invention positions the corresponding node along a corresponding tier selected from the plurality of sequentially-ordered tiers through the knowledge-tree generating algorithm. When the corresponding node from the plurality of education-related information and the corresponding node from the plurality of experience-related information are assigned and positioned, the present invention displays the plurality of sequentially-ordered tiers through the corresponding PC device of the specific learner account.

In reference to the previous example, wherein the specific learner account has experience in driving a manual transmission vehicle, the data entry will be represented within the plurality of branches since the data entry is experience-related. In this instance, the experience in driving will be represented by a primary node selected from the hierarchical network of nodes. The primary node will be positioned along a primary tier from the plurality of sequentially-ordered tiers. A secondary node from the hierarchical network of nodes will represent the area the vehicle driven by the specific learner account, wherein the secondary node is positioned along a secondary tier selected from the plurality of sequentially-ordered tiers. A tertiary node from the hierarchical network of nodes will represent the exact country the vehicle was driven in and will be positioned along a tertiary tier from the plurality of sequentially-ordered tiers. The positioning of the primary tier, the secondary tier, and the tertiary tier is such that, the primary tier is the closest to the origin of the knowledge-tree. The tertiary tier is positioned farthest away from the origin such that the secondary tier is positioned in between the primary tier and the tertiary tier. By traversing the primary node, the secondary node, and the tertiary node, vital information regarding an experience from the plurality of experience-related information can be obtained. Similarly, by traversing nodes at the root portion, vital information regarding an educational qualification from the plurality of education-related information can be obtained.

To identify each of the plurality of education-related information and each of the experience-related information on the knowledge-tree, the present invention is provided with a coordinate system that is managed by the at least one remote server. A relevant coordinate from the coordinate system is assigned to each intersection point between a node from the hierarchical network of nodes and a tier from the plurality of sequentially-ordered tiers. The relevant coordinate is assigned through the knowledge-tree generating algorithm. When the relevant coordinate is assigned, the present invention displays the hierarchical network of nodes, the plurality of sequentially-ordered tiers, and the relevant coordinate for each intersection point is displayed through the corresponding PC device of the specific learner account.

Preferably, a three-point coordinate system will be used as the coordinate system. We will consider the previous example wherein the specific learner claims to have experience in driving a manual transmission vehicle. The experience number will be represented by a first point from the three-point coordinate system. Since driving is the only experience discussed in this example, the experience number is assigned to be 1. If a second experience was discussed, the second experience number will be 2. A second point from the three-point coordinate system represents the tier number in which the primary node is positioned in. Since the primary node representing the experience in driving is positioned along the first tier, the second point will be 1 as well. A third point of the three-point coordinate system describes the specificity of a selected node relative to the experience represented by the knowledge-tree. Since the knowledge-tree in this example represents driving, the third point is assigned to be 0. Thus, as shown in FIG. 1B, the coordinate for the primary node will be (1,1,0). As further illustrated in FIG. 1B, if the primary node was positioned along the root portion, the coordinates of the primary node will be (1,−1,0) since the root portion is positioned opposite to the plurality of branches along a stem of the knowledge-tree.

With reference to the secondary node, the area will be a category extending from the category of driving. Thus, the first point from the three-point coordinate system will be 2. Since the secondary node is positioned along the secondary tier, the second point of the three-point coordinate system will be 2. Since the country the vehicle was driven in extends from the category of driving which was assigned 1, the third point of the three-point coordinate system for the secondary node will be assigned 1. Thus, the coordinate for the secondary node will be (2,2,1).

The process of node traversing helps develop a storyline from the knowledge-tree and can be understood by utilizing the coordinate system. In reference to FIG. 1B, if the nodes (1,3,1), (1,2,1), (2,2,1), (5,3,2), (3,2,1), and (10,3,3) are traversed, the storyline generated from the knowledge-tree would be that the user has experience driving a Porsche with 4-wheels in the United States. Likewise, a plurality of combinations is made possible by traversing the hierarchical network of nodes.

Preferably, each node of the hierarchical network of nodes will consist of a set of node properties. The set of node properties will provide additional information regarding each node of the hierarchical network of nodes. Referring to the previous example, wherein the knowledge-tree is used to describe the experience in driving, the node (1,3,1) will give additional information about the vehicle with 4-wheels. The information included in the set of node properties can be, but is not limited to, type of 4-wheel vehicle. As an example, the type of 4-wheel vehicle can be listed to be either a car or a van. The set of properties included in each of the hierarchical network of nodes will be different from one another. In another instance, if the node (10,3,3) is selected, the set of node properties will give additional information about the Porsche vehicle.

Figure 6:
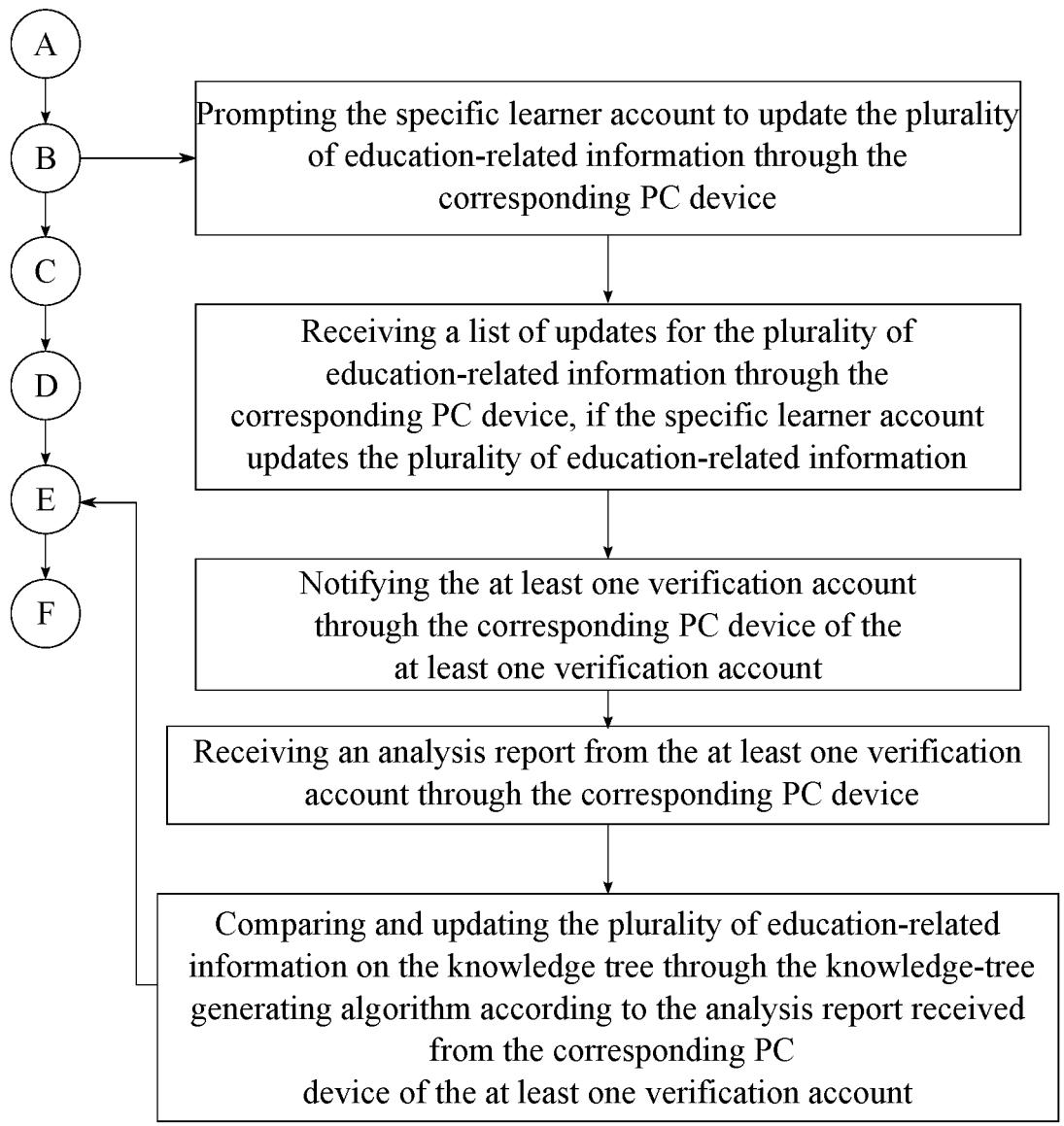
FIG. 6 is a flowchart illustrating the basic overall process of updating the education-related information.
Figure 7:
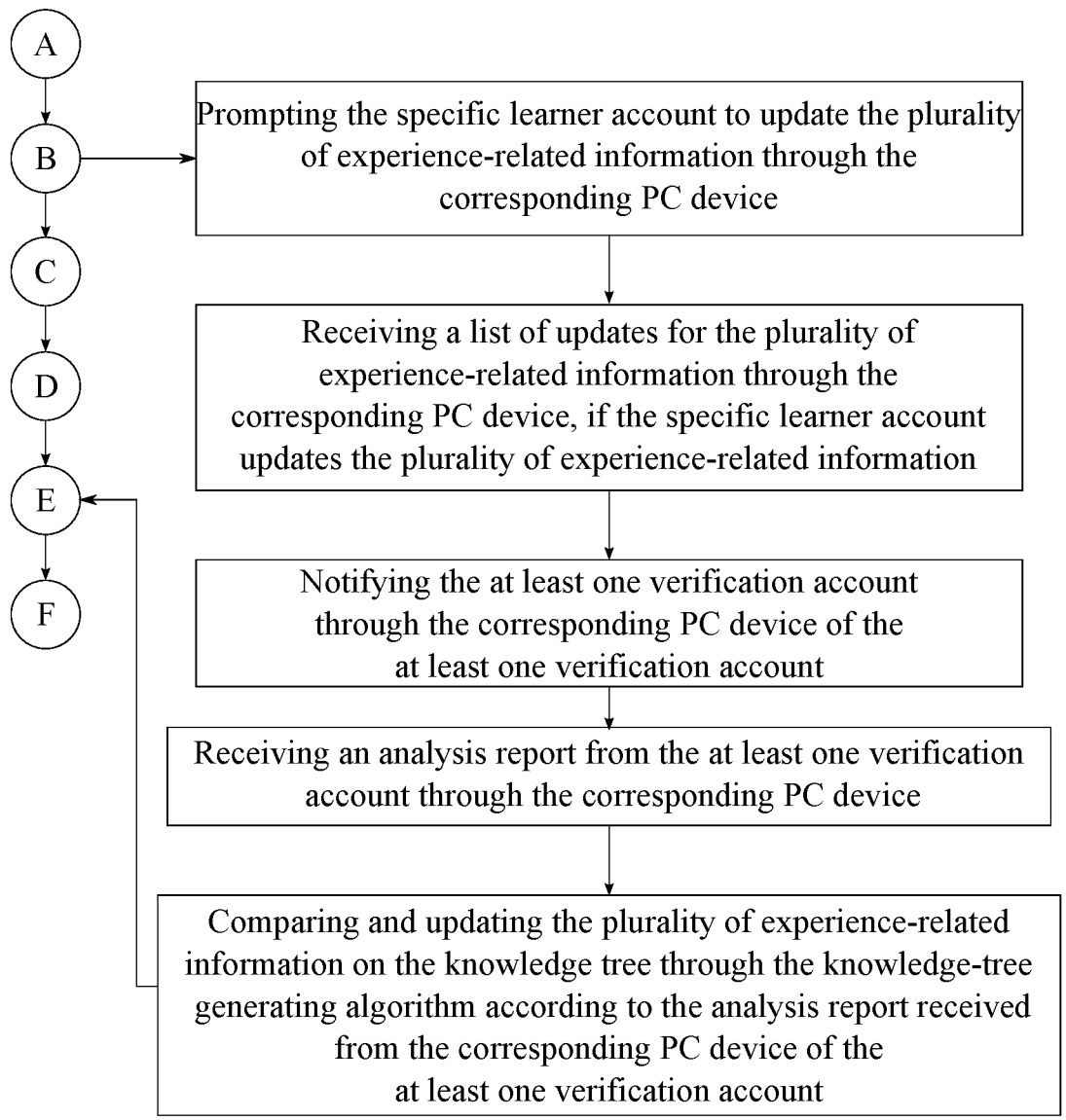
FIG. 7 is a flowchart illustrating the basic overall process of updating the experience-related information.

As illustrated in FIG. 6 and FIG. 7, in addition to displaying existing educational qualifications and existing experiences, the present invention also allows the user to update the knowledge-tree periodically. If the specific learner account wishes to update the plurality of education-related information, the present invention prompts the specific learner account to update the plurality of education-related information through the corresponding PC device. If the specific learner account updates the plurality of education-related information, the present invention receives a list of updates for the plurality of education-related information. Upon receiving, the list of updates, the present invention notifies the at least one verification account through the corresponding PC device of the at least one verification account regarding the list of updates. Thus, the at least one verification account can verify the list of updates the present invention received from the specific learner account. After the at least one verification account is notified, the present invention receives an analysis report of the list of updates through the corresponding PC device of the at least one verification device. Based upon the analysis report, the present invention compares the list of updates with the plurality of education-related information on the knowledge-tree and updates the plurality of education-related information on the knowledge-tree for the specific learner account utilizing the knowledge-tree generating algorithm. Referring to the previous education-related example, if the specific learner account received a master's degree, and the master's degree is verified by the at least one verification account, the present invention updates the knowledge-tree to represent the master's degree. However, if the list of updates from the specific learner account is not verified by the at least one verification account, the knowledge-tree is not updated with the list of updates is not updated for the plurality of education-related information.

Similar to updating the plurality of education-related information, the specific learner account can also update the plurality of experience-related information. To do so, the present invention prompts the specific learner account to update the plurality of experience-related information through the corresponding PC device. If the specific learner account updates the plurality of experience-related information, the present invention receives a plurality of updates for the plurality of experience-related information. Upon receiving the list of updates for the plurality of experience-related information, the present invention notifies the at least one verification account through the corresponding PC device. After notifying the at least one verification account, the present invention receives an analysis report from the at least one verification account through the corresponding PC device. Based upon the analysis report received from the at least one verification account, the present invention proceeds to compares the list of updates with the plurality of experience-related information on the knowledge-tree and update the plurality of experience-related information on the knowledge-tree for the specific learner account utilizing the knowledge-tree generating algorithm. Referring to the previous experience-related example, if the specific learner account has obtained programming experience in the United States, and the programming experience in the United States is verified by the at least one verification account, the present invention updates to represent the programming experience in the United States. However, if the list of updates for the specific learner account is not verified by the at least one verification account, the knowledge-tree is not updated with the list of updates for the plurality of experience-related information. The verified information and the unverified information will be represented differently on the knowledge-tree. As an example, if the plurality of education-related information and/or the plurality of experience-related information are verified by the at least one verification account by reviewing reference letters, certificates etc. the plurality of education-related information and the plurality of experience-related information are represented on the knowledge-tree with a first color. If the plurality of education-related information and/or the plurality of experience-related information is not verified by the at least one verification account, the plurality of education-related information and the plurality of experience-related information will be represented on the knowledge-tree with a second color which is distinct from the first color. In another instance, if the specific learner account uploads information regarding an aspirational education goal or an aspirational experience goal, the aspirational educational goal and the aspirational experience goal will be represented on the knowledge-tree with a third color which is distinct from the first color and the second color. In another instance, as illustrated in FIG. 1A, the verified information can be represented via a solid connection path, whereas the unverified information will be represented through a first broken connection path and the aspirational goal information will be represented through a second broken connection path.

The at least one verification account can be utilized by different administrators. As an example, the at least one verification account can be an analyst account in one instance. In another instance, the at least one verification account can be a field attester account, wherein the field attester account is administered by an expert in the respective field. If the specific user account claims to have experience in programming languages, an expert in the field of programming languages will be assigned by the present invention to verify the experience of the specific user account. However, the at least one verification account can be, but is not limited to, a mentor, trainer or support personnel. The verification process executed by the at least one verification account can be, but is not limited to, interviews and one-on-one discussions.

Figure 8:
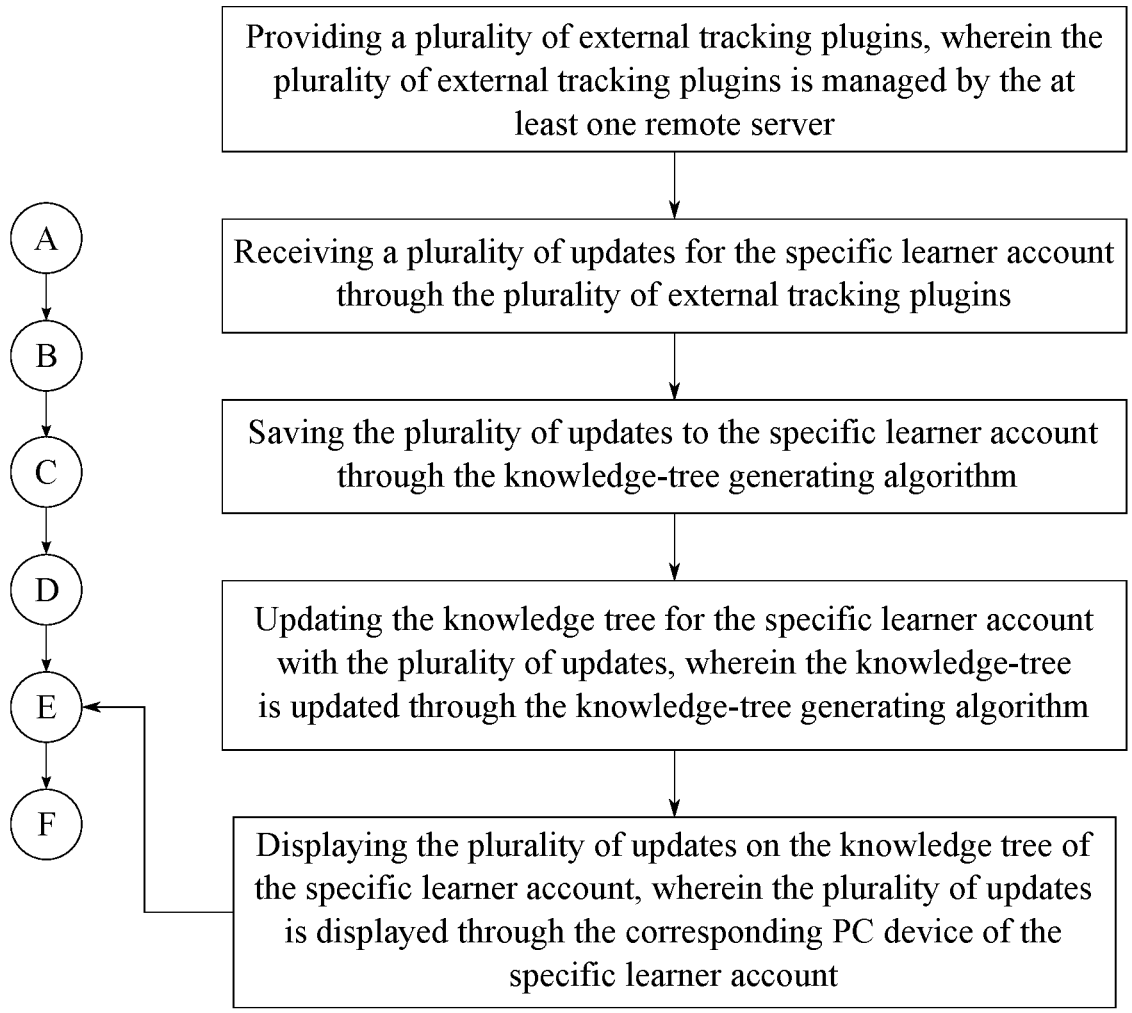
FIG. 8 is a flowchart illustrating the basic overall process of receiving updates from a plurality of external tracking plugins.
Figure 9:
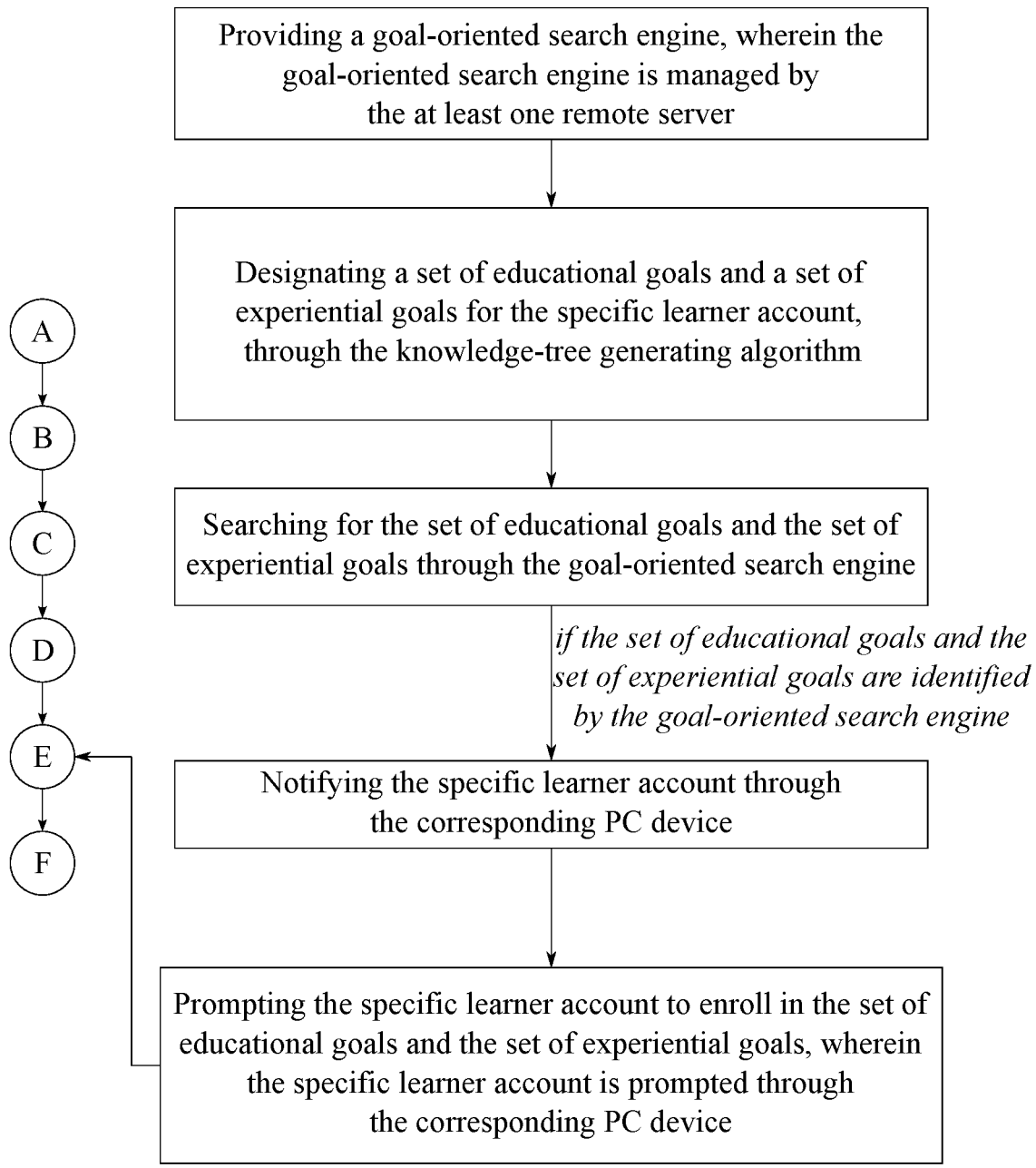
FIG. 9 is a flowchart illustrating the basic overall process of enrolling in a recommended program to update the plurality of education-related information and/or the plurality of experience-related information.

The present invention is also provided with the ability to track the progress of the specific learner account in a selected field. As shown in FIG. 8, to do so, the present invention is provided with a plurality of external tracking plugins that is managed by the at least one remote server. The plurality of external tracking plugins will be connected to a program or experience that can be beneficial to the specific learner account. As an example, if the specific learner account has a background in programming languages, a selected plugin from the plurality of tracking plugins will be associated with a programming course that will allow the specific learner account to get a new education-related qualification. The present invention receives a plurality of updates for the specific learner account through the plurality of external tracking plugins. Upon receiving the plurality of updates, the present invention saves the plurality of updates to the specific learner account through the knowledge-tree generating algorithm. By saving the plurality of updates, the present invention updates the knowledge-tree for the specific learner account, wherein the knowledge-tree is updated through the knowledge-tree generating algorithm. When the knowledge-tree is updated with the plurality of updates, the present invention displays the plurality of updates on the knowledge-tree of the specific learner account through the corresponding PC device. The plurality of updates can vary according to the plurality of external tracking plugins. As an example, the plurality of updates can be associated to the plurality of education-related information. In another instance, the plurality of updates can be associated to the plurality of experience-related information. If the selected plugin is associated with a programming course as mentioned before, the plurality of external tracking plugins will retrieve a plurality of time-dependent information. As an example, the selected plugin will retrieve information to verify that the programming course was completed within a certain time. In another instance, the selected plugin will monitor the time the specific learner account spent on learning.

In addition to receiving and updating existing education-related information and experience-related information, the present invention also encourages the plurality of learner accounts to add to the plurality of education-related information and the plurality of experience-related information by engaging in new opportunities. To provide information to the plurality of learner accounts, the present invention is provided with a goal-oriented search engine which is managed by the at least one remote server. To encourage the specific learner account to engage in new opportunities, the present invention designates a set of educational goals and a set of experiential goals for the specific learner account. More specifically, the set of educational goals and the set of experiential goals are designated through the knowledge-tree generating algorithm. The set of educational goals and the set of experiential goals will be related to the plurality of education-related information and the plurality of experience-related information respectively. As discussed before, if the specific learner account has an undergraduate degree in electrical engineering, the set of educational goals and the set of experiential goals will be related to the undergraduate degree in electrical engineering. When the set of educational goals and the set of experiential goals are determined, the present invention proceeds to search for the set of educational goals and the set of experiential goals through the goal-oriented search engine. If the set of educational goals and the set of experiential goals are identified by the goal-oriented search engine, the present invention notifies the specific learner account through the corresponding PC device. Upon notifying the specific learner account, the present invention prompts the specific learner account through the corresponding PC device to enroll in the set of educational goals and the set of educational goals. Referring to the previous example, the present invention can prompt the specific learner account to enroll in a graduate program related to electrical engineering. In another instance, the present invention can prompt the specific user account to enroll in a job opportunity that is related to electrical engineering.

Figure 10:
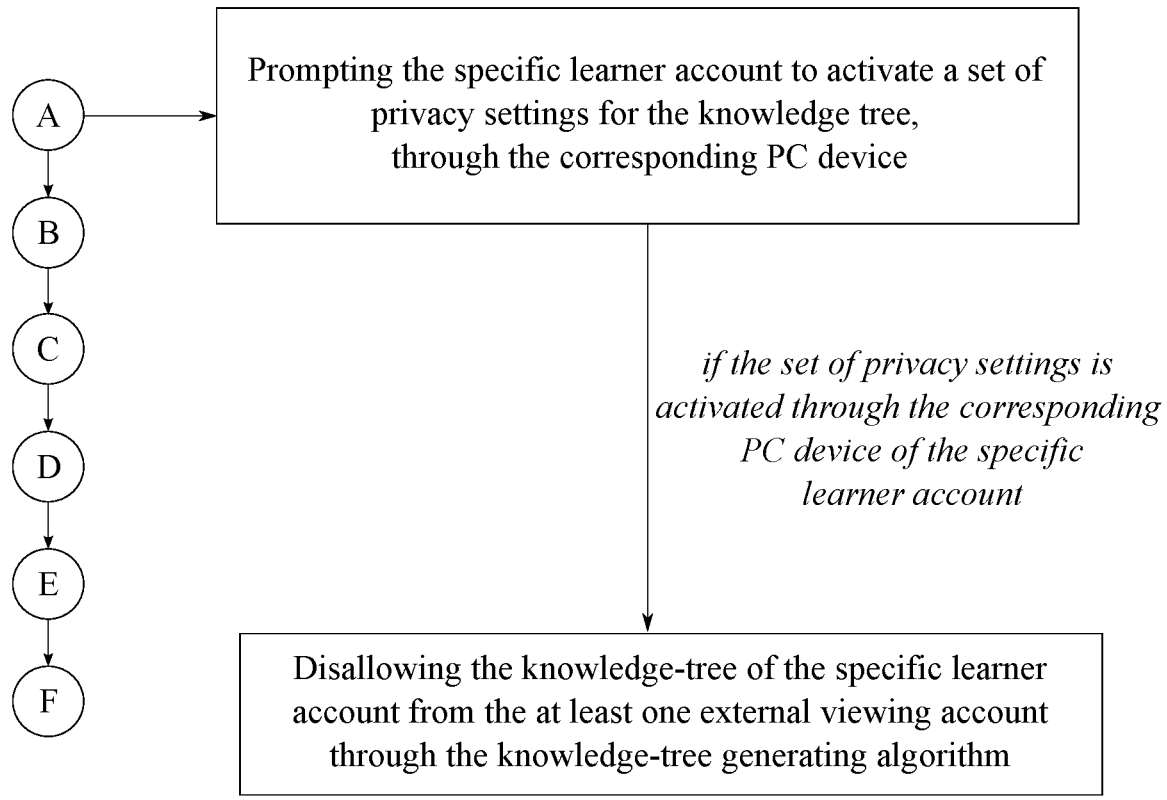
FIG. 10 is a flowchart illustrating the basic overall process of activating privacy settings, wherein the education-related information and the experience-related information is shielded.
Figure 11:
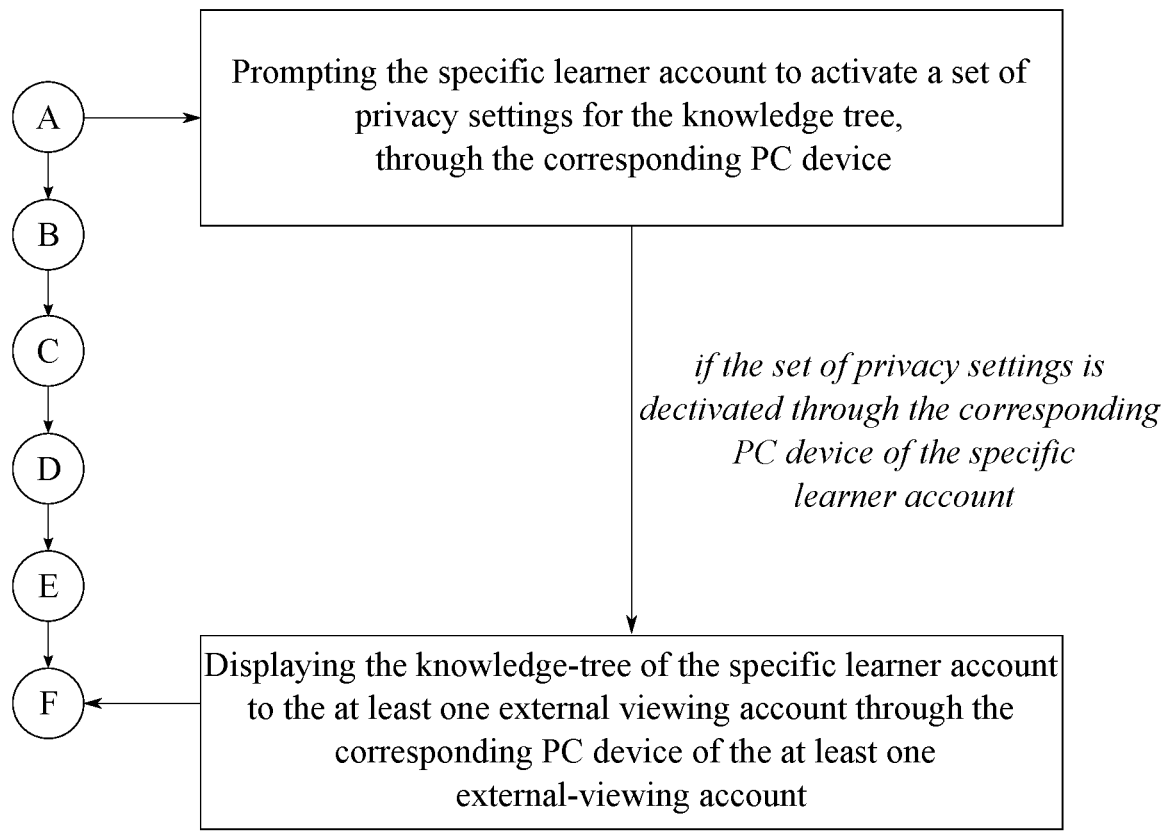
FIG. 11 is a flowchart illustrating the basic overall process of deactivating the privacy settings, wherein the education-related information and the experience-related information is not shielded.

As discussed earlier, after the plurality of education-related information and the plurality of experience-related information is used to generate the knowledge-tree, the present invention displays the knowledge-tree to the external-viewing account which can be, but is not limited to, a potential employer. However, as shown in FIG. 10, if the specific learner account wishes to temporarily prevent the at least one viewing account from accessing the knowledge-tree of the specific learner account, the present invention facilitates the shielding process by prompting the specific learner account to activate a set of privacy settings. If the set of privacy settings is activated by the specific learner account through the corresponding PC device, the present invention disallows the knowledge-tree of the specific learner account to be viewed by the at least one external-viewing account through the knowledge-tree generating algorithm. As shown in FIG. 11, on the other hand, if the set of privacy settings is deactivated by the specific learner account through the corresponding PC device, the knowledge-tree is displayed to the at least one external viewing account through the corresponding PC device.

As mentioned earlier, if the present invention is being used during a job search, the specific learner account is administered by a job-seeking individual. To verify the plurality of education-related information and the plurality of experience-related information, the at least one verification account is assigned by the present invention according to the plurality of education-related information and the plurality of experience-related information. If the present invention is being used during a job search, the at least one external-viewing account is administered by a recruiter or potential employer.

When the present invention is being used as a service, service interactions are executed in three main categories. The first category, which is represented by the plurality of learner accounts, receives services from the second category and the third category. The second category and the third category are used to provide the services requested by the specific learner account from the plurality of learner accounts. The second category is represented by the at least one verification account. On the other hand, the third category is represented by the at least one external-viewing account. As discussed before, each of the plurality of learner accounts, the at least one verification account, and the at least one external-viewing account is associated with a corresponding PC device which can be, but is not limited to, a mobile phone, a computer, or a wearable device.

In order to utilize the present invention, the specific learner account executes a registration process that allows the specific learner account to enter identification information and select a preferred service. Referring to the previous example between a job-seeking individual and a potential employer, the specific learner account will enroll in a service that allows the specific learner account to search for a job. According to the service selected by the specific learner account and the background of the specific learner account the present invention will assign the at least one verification account. The at least one verification account can be, but is not limited to, an analyst, a mentor, or a trainer. In addition to verifying the plurality of education-related information and the plurality of experience-related information, the at least one verification account also generates a career roadmap for the specific learner account and constantly monitors the learning process of the specific learner account. To do so, the at least one verification account will perform interviews, receive career path confirmations, track weekly learning progressions, perform learning trend analysis, and generate feedback reports. Furthermore, the at least one verification account will derive an expertise level for the specific learner account, based upon the plurality of education-related information, the plurality of experience-related information, and the current status of the specific learner account. As an example, based upon the expertise level of the specific learner account, the at least one verification account will assign the specific learner account to be a beginner, a challenger, an emerging champion, or a niche player. The different expertise levels function as a filtering process for the at least one external-viewing account. As an example, if the specific learner account is designated to be a beginner, the at least one external-viewing account can offer opportunities to the specific learner account according to the expertise level of a beginner. To do so, the at least one external-viewing account will be preferably administered by an internship provider, recruiter, or course provider. With the growth in information stored on the at least one remote server, the present invention will incorporate technologies that can be, but is not limited to, blockchain technologies. By doing so, the present invention will have the ability to simplify the management of the plurality of education-related information and the plurality of experience-related information.

Although the invention has been explained in relation to its preferred embodiment, it is to be understood that many other possible modifications and variations can be made without departing from the spirit and scope of the invention as hereinafter claimed.

What is claimed is:

1. A method of generating a knowledge-tree for intuitive continual learning comprising the steps of:

providing at least one remote server, wherein the at least one remote server comprising a knowledge-tree generating algorithm;

providing a plurality of learner accounts managed by the at least one remote server, wherein each of the plurality of learner accounts is associated with a corresponding personal computing (PC) device;

providing at least one verification account managed by the at least one remote server, wherein the at least one verification account is associated with a corresponding PC device;

providing at least one external-viewing account managed by the at least one remote server, wherein the at least one external-viewing account is associated with a corresponding PC device;

prompting a specific learner account from the plurality of learner accounts to upload a plurality of education-related information and a plurality of experience-related information through the corresponding PC device;

receiving and categorizing the plurality of education-related information and the plurality of experience-related information through the corresponding PC device of the specific learner account;

sending the plurality of education-related information and the plurality of experience-related information from the corresponding PC device of the specific learner account to the at least one remote server;

assigning and prompting the at least one verification account to verify the plurality of education-related information and the plurality of experience-related information through the corresponding PC device;

prompting the specific learner account to update the plurality of experience-related information through the corresponding PC device;

receiving a list of updates for the plurality of experience-related information through the corresponding PC device, when the specific learner account updates the plurality of experience-related information;

notifying the at least one verification account through the corresponding PC device of the at least one verification account;

receiving an analysis report from the at least one verification account through the corresponding PC device;

comparing and updating the plurality of experience-related information on the knowledge tree through the knowledge-tree generating algorithm according to the analysis report received from the corresponding PC device of the at least one verification account;

wherein the at least one verification account is an analyst account;

providing a goal-oriented search engine, wherein the goal-oriented search engine is managed by the at least one remote server;

designating a set of educational goals and a set of experiential goals for the specific learner account, through the knowledge-tree generating algorithm;

searching for the set of educational goals and the set of experiential goals through the goal-oriented search engine;

notifying the specific learner account through the corresponding PC device, when the set of educational goals and the set of experiential goals are identified by the goal-oriented search engine;

prompting the specific learner account to enroll in the set of educational goals and the set of experiential goals, wherein the specific learner account is prompted through the corresponding PC device;

generating a knowledge-tree by inputting the plurality of education-related information and the plurality of experience-related information into the knowledge-tree generating algorithm, when the plurality of education-related information and the plurality of education-related information is verified by the at least one verification account through the corresponding PC device;

wherein the knowledge-tree comprising a root portion and a plurality of branches;

displaying the plurality of education-related information along the root portion through the corresponding PC device of the specific learner account;

displaying each of the plurality of experience-related information on a corresponding branch from the plurality of branches, wherein each of the plurality of experience-related information is displayed through the corresponding PC device of the specific learner account;

providing a hierarchical network of nodes, wherein the hierarchical network of nodes is managed by the at least one remote server and the hierarchical network of nodes is associated with the knowledge-tree;

providing a plurality of sequentially-ordered tiers managed by the at least one remote server, wherein each node of the hierarchical network of nodes is associated with a tier from the plurality of sequentially-ordered tiers through the knowledge-tree generating algorithm;

assigning each of the plurality of education-related information to a corresponding node from the hierarchical network of nodes, wherein the corresponding node is assigned through the knowledge-tree generating algorithm;

positioning the corresponding node along a corresponding tier selected from the plurality of sequentially-ordered tiers through the knowledge-tree generating algorithm;

assigning each of the plurality of experience-related information to a corresponding node selected from the hierarchical network of nodes, wherein the corresponding node is assigned through the knowledge-tree generating algorithm;

positioning the corresponding node along a corresponding tier selected from the plurality of sequentially-ordered tiers through the knowledge-tree generating algorithm;

displaying the plurality of sequentially-ordered tiers through the corresponding PC device of the specific learner account; and displaying the knowledge-tree to the at least one external-viewing account through the corresponding PC device, when the specific learner account permits the external viewing account to view the knowledge tree.

2. The method of generating a knowledge-tree for intuitive continual learning as claimed in claim 1 further comprising the steps of:

providing a coordinate system managed by the at least one remote server;

assigning a relevant coordinate from the coordinate system to each intersection point between a node from the hierarchical network of nodes and a tier from the plurality of sequentially-ordered tiers, through the knowledge-tree generating algorithm; and displaying the hierarchical network of nodes, the plurality of sequentially-ordered tiers, and the relevant coordinate for each intersection point through the corresponding PC device of the specific learner account.

3. The method of generating a knowledge-tree for intuitive continual learning as claimed in claim 1 further comprising the steps of:

prompting the specific learner account to update the plurality of education-related information through the corresponding PC device;

receiving a list of updates for the plurality of education-related information through the corresponding PC device, when the specific learner account updates the plurality of education-related information;

notifying the at least one verification account through the corresponding PC device of the at least one verification account;

receiving an analysis report from the at least one verification account through the corresponding PC device; and comparing and updating the plurality of education-related information on the knowledge tree through the knowledge-tree generating algorithm according to the analysis report received from the corresponding PC device of the at least one verification account.

4. The method of generating a knowledge-tree for intuitive continual learning as claimed in claim 1, wherein the at least one verification account is a field attester account.

5. The method of generating a knowledge-tree for intuitive continual learning as claimed in claim 1 further comprising the steps of:

providing a plurality of external tracking plugins, wherein the plurality of external tracking plugins is managed by the at least one remote server;

receiving a plurality of updates for the specific learner account through the plurality of external tracking plugins;

saving the plurality of updates to the specific learner account through the knowledge-tree generating algorithm;

updating the knowledge tree for the specific learner account with the plurality of updates, wherein the knowledge-tree is updated through the knowledge-tree generating algorithm; and displaying the plurality of updates on the knowledge tree of the specific learner account, wherein the plurality of updates is displayed through the corresponding PC device of the specific learner account.

6. The method of generating a knowledge-tree for intuitive continual learning as claimed in claim 5, wherein the plurality of external tracking plugins retrieves a plurality of time-dependent information.

7. The method of generating a knowledge-tree for intuitive continual learning as claimed in claim 5, wherein the plurality of updates is associated to the plurality of education-related information.

8. The method of generating a knowledge-tree for intuitive continual learning as claimed in claim 5, wherein the plurality of updates is associated to the plurality of experience-related information.

9. The method of generating a knowledge-tree for intuitive continual learning as claimed in claim 1 further comprising the steps of:
  prompting the specific learner account to activate a set of privacy settings for the knowledge tree, through the corresponding PC device;
  disallowing the knowledge-tree of the specific learner account from the at least one external viewing account through the knowledge-tree generating algorithm, when the set of privacy settings is activated through the corresponding PC device of the specific learner account; and
  displaying the knowledge-tree of the specific learner account to the at least one external viewing account through the corresponding PC device of the at least one external-viewing account, when the set of privacy settings is deactivated through the corresponding PC device of the specific learner account.

10. The method of generating a knowledge-tree for intuitive continual learning as claimed in claim 1, wherein the specific learner account is administered by a job-seeking individual.

11. The method of generating a knowledge-tree for intuitive continual learning as claimed in claim 1, wherein the at least one verification account is assigned according to the plurality of education-related information and the plurality of experience-related information.

12. The method of generating a knowledge-tree for intuitive continual learning as claimed in claim 1, wherein the at least one external-viewing account is administered by a recruiter.

* * * * *